(12) United States Patent
Hu et al.

(10) Patent No.: US 10,160,059 B2
(45) Date of Patent: Dec. 25, 2018

(54) DECOUPLED LIQUID-JET GUIDED LASER NOZZLE CAP

(71) Applicant: General Electric Company, Schenectady, NY (US)

(72) Inventors: Zhaoli Hu, Greer, SC (US); Abe Denis Darling, Laurens, SC (US); William A. Zimmerman, Fountain Inn, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 519 days.

(21) Appl. No.: 15/059,327

(22) Filed: Mar. 3, 2016

(65) Prior Publication Data

US 2017/0252865 A1 Sep. 7, 2017

(51) Int. Cl.
*B23K 26/146* (2014.01)
*B23K 26/14* (2014.01)

(52) U.S. Cl.
CPC ........ *B23K 26/146* (2015.10); *B23K 26/1482* (2013.01)

(58) Field of Classification Search
CPC .......................... B23K 26/146; B23K 26/1482
USPC ....................................... 218/121.84, 121.85
See application file for complete search history.

(56) References Cited

U.S. PATENT DOCUMENTS

| | | | |
|---|---|---|---|
| 4,121,085 A | 10/1978 | Diemer et al. | |
| 5,902,499 A | 5/1999 | Richerzhagen | |
| 6,118,097 A | 9/2000 | Kaga et al. | |
| 6,545,247 B2 | 4/2003 | Mukasa et al. | |
| 7,705,266 B2 | 4/2010 | Koseki et al. | |
| 8,134,098 B2 | 3/2012 | Muratsubaki et al. | |
| 8,859,988 B1 | 10/2014 | Gaebelein et al. | |
| 8,946,588 B2 * | 2/2015 | Suruceanu | B23K 26/382 219/121.71 |
| 9,776,284 B2 * | 10/2017 | Hu | B23K 26/384 |
| 10,022,820 B2 * | 7/2018 | Gaebelein | B23K 26/38 |
| 2007/0278195 A1 | 12/2007 | Richerzhagen et al. | |
| 2015/0165553 A1 | 6/2015 | Gaebelein et al. | |
| 2015/0165559 A1 | 6/2015 | Gaebelein et al. | |

FOREIGN PATENT DOCUMENTS

| | | |
|---|---|---|
| CA | 2330426 A | 11/1999 |
| EP | 1833636 B1 | 7/2010 |
| WO | WO2007013293 A1 | 2/2007 |

* cited by examiner

*Primary Examiner* — Mark Paschall
(74) *Attorney, Agent, or Firm* — Dority & Manning, P.A.

(57) ABSTRACT

A head assembly for a liquid jet guided laser system is disclosed having a coupling unit removably disposed to a laser focus optic module of the laser system. The coupling unit has a nozzle assembly removably connected to the coupling unit. The nozzle assembly has a liquid jet nozzle and a nozzle cap. The nozzle cap has a plurality of axial assist gas conduits and static assist gas conduits in fluid communication with an assist gas source extending through the nozzle cap body to individually transport assist gas to axial exit ports and static exit ports positioned to exhaust assist gas proximate the liquid jet. At least a portion of the plurality of axial assist gas conduits are partitioned from fluid communication with the liquid jet hole. A lateral movement assembly can be configured between the laser focus optic module and coupling unit.

20 Claims, 6 Drawing Sheets

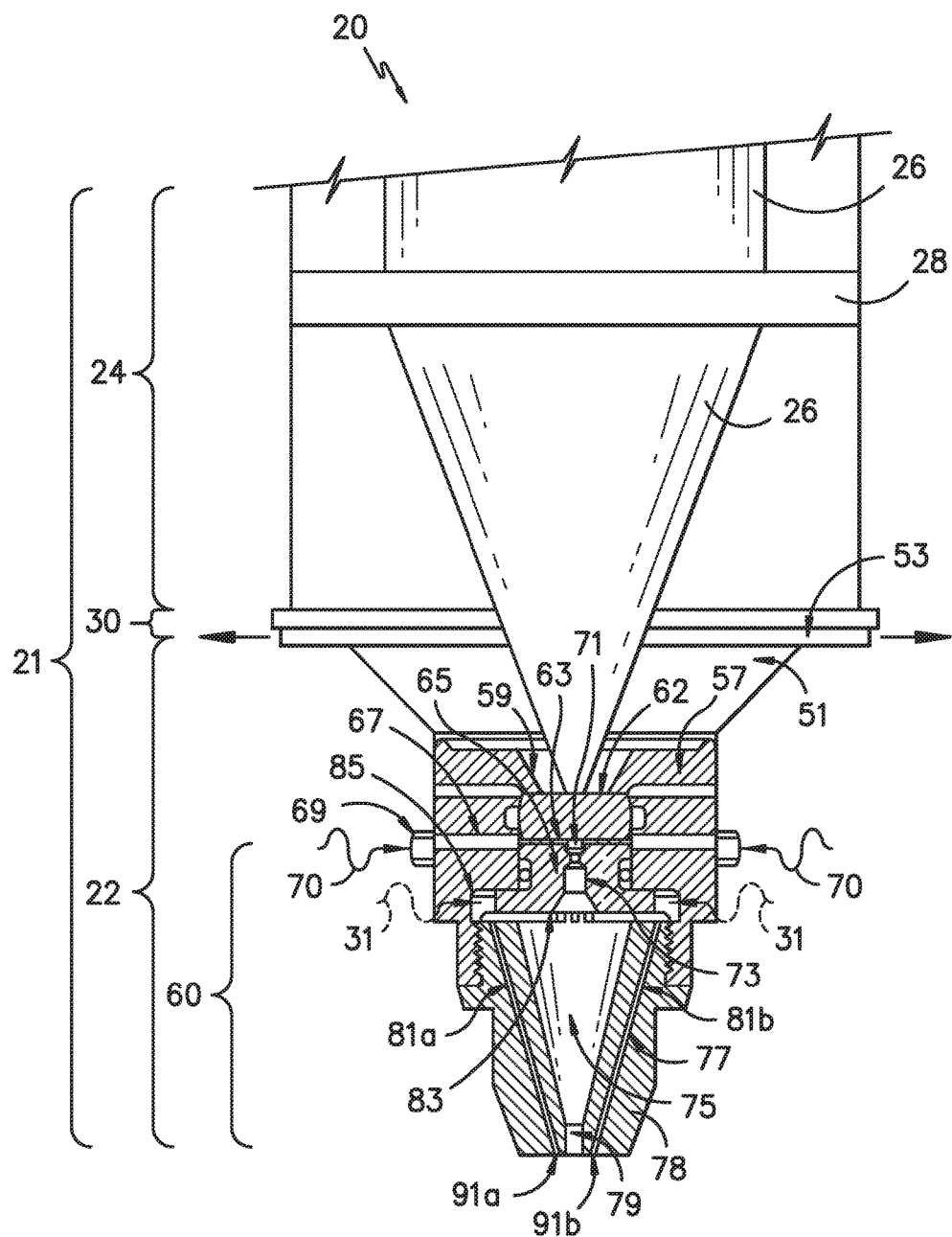
FIG. -1-

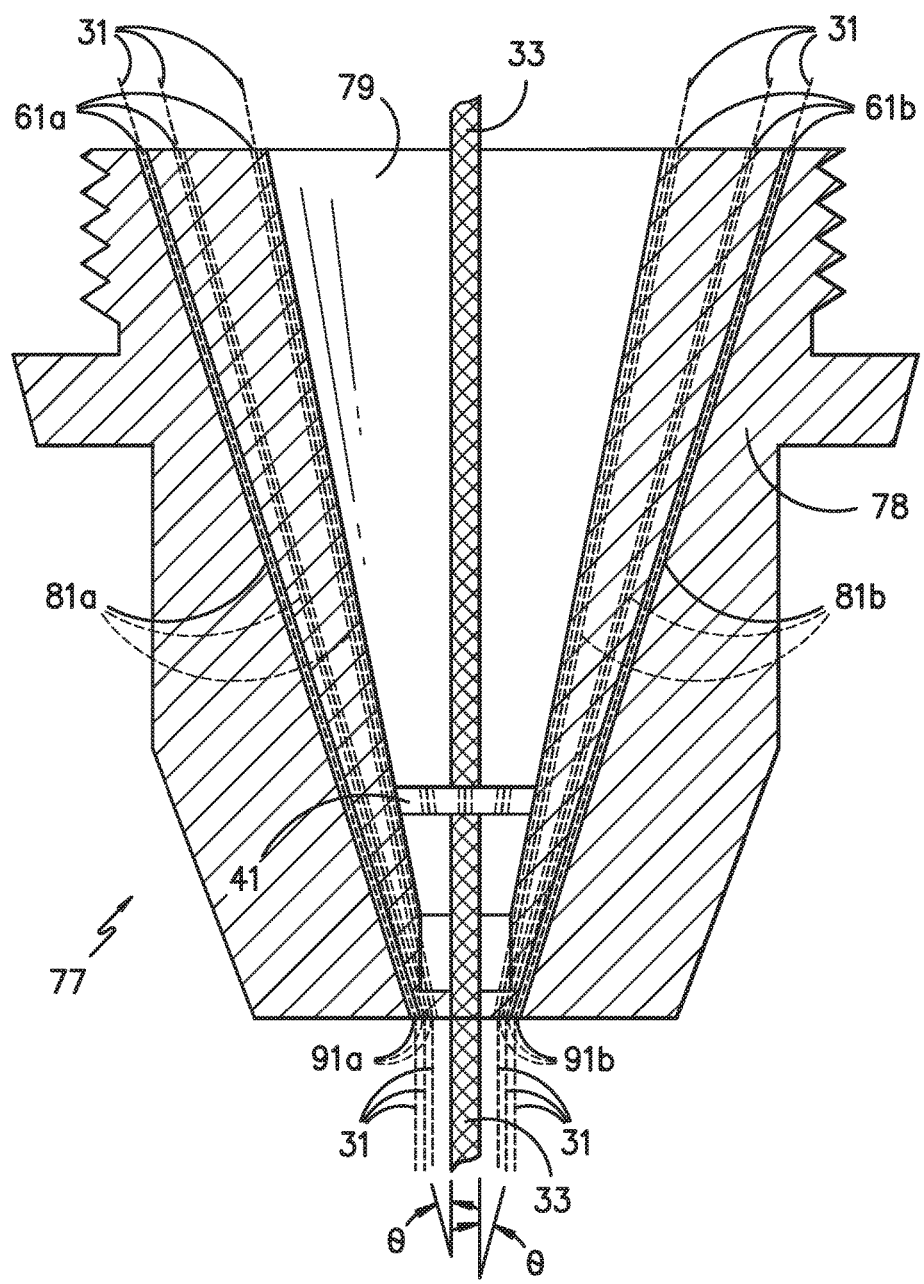
FIG. -2-

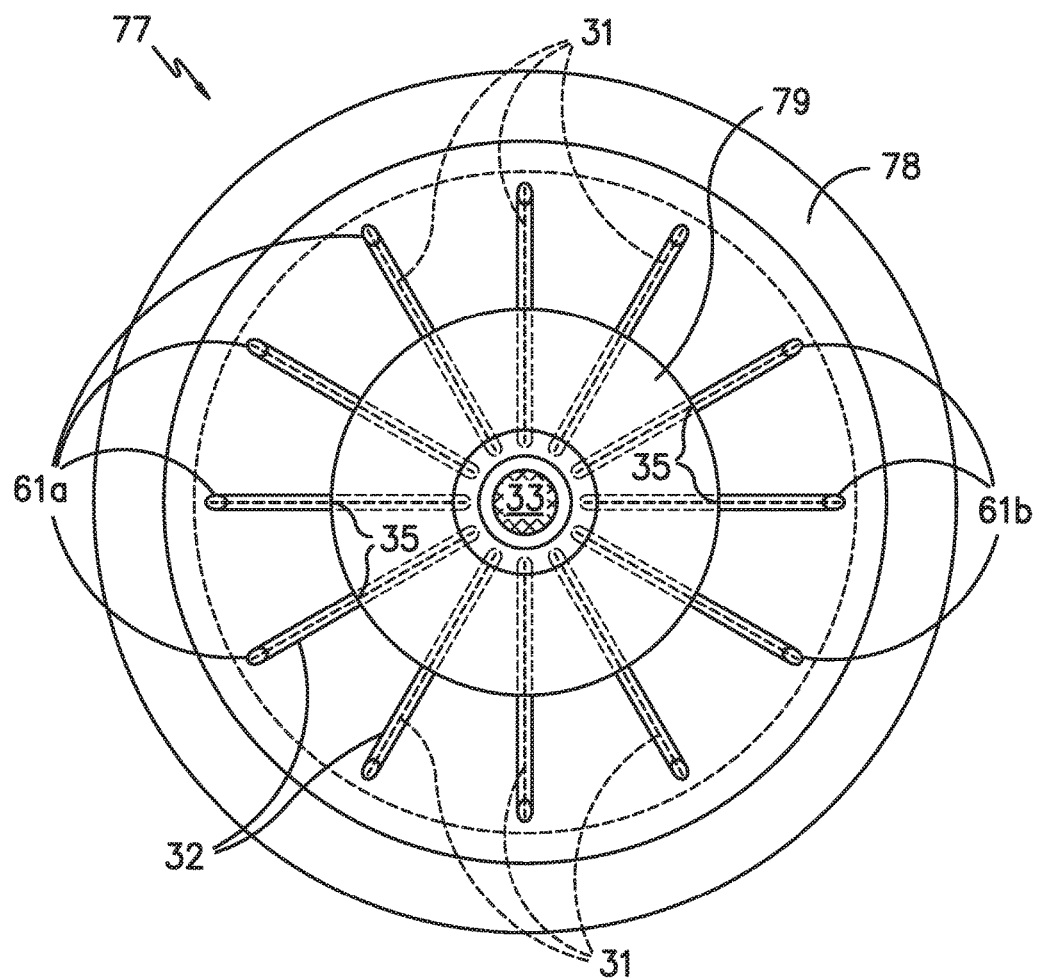
FIG. -3-

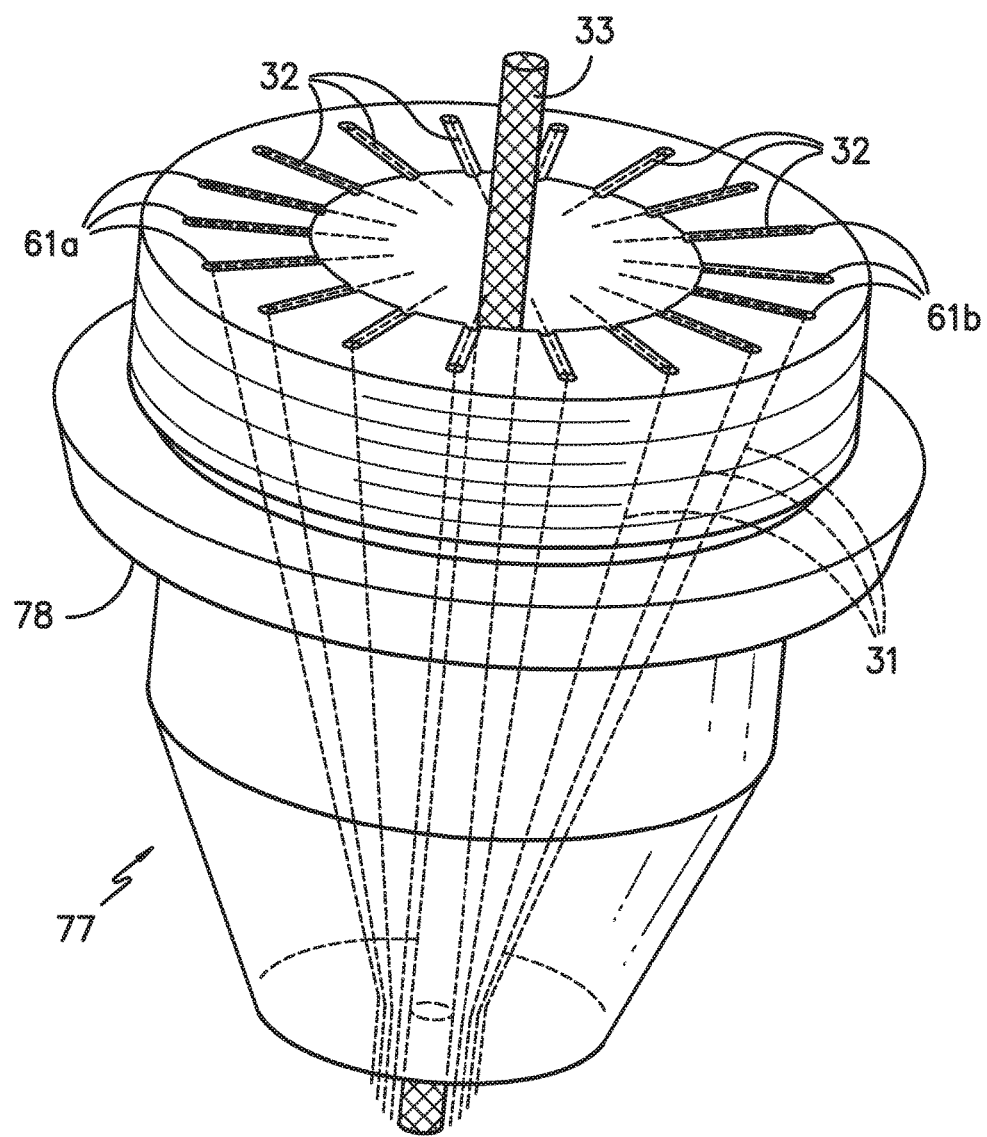
FIG. -4-

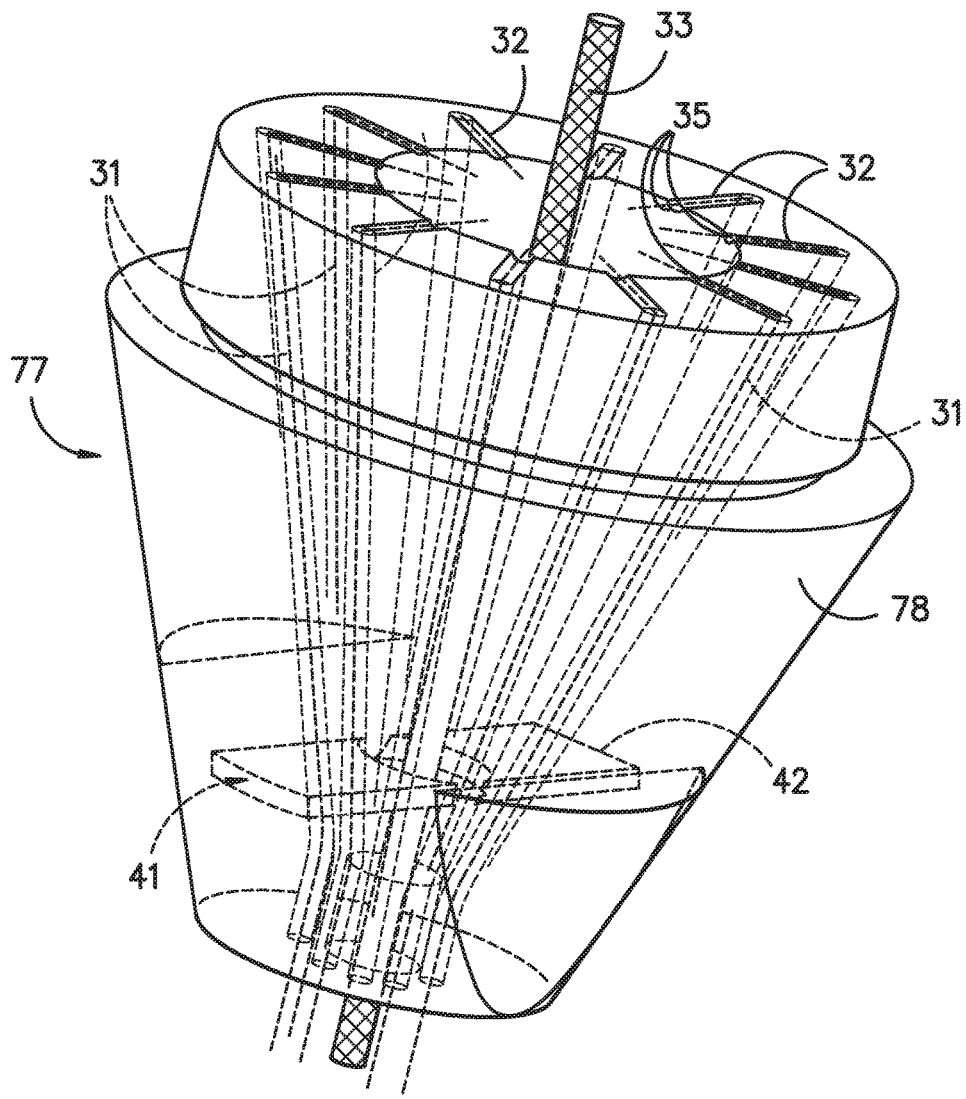
FIG. -5-

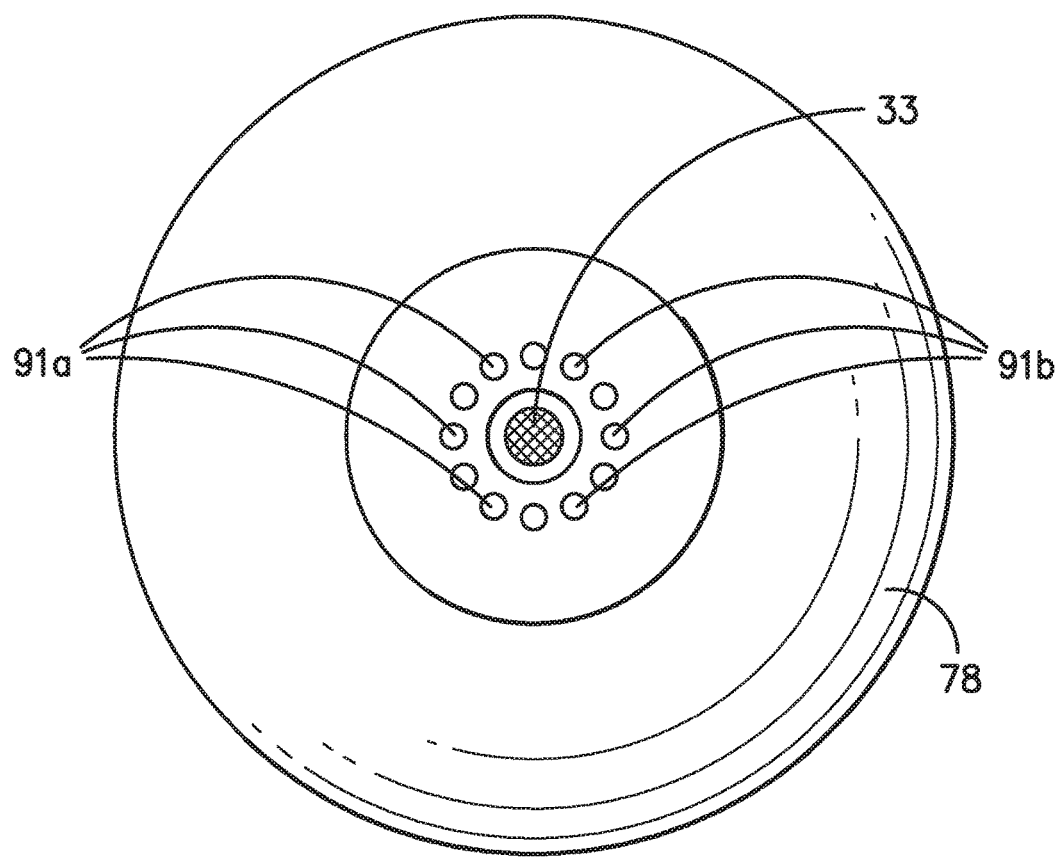
FIG. —6—

DECOUPLED LIQUID-JET GUIDED LASER NOZZLE CAP

FIELD OF THE DISCLOSURE

Generally, a nozzle cap for a liquid-jet guided laser system is disclosed. Specifically, the nozzle cap decouples the liquid jet from the axial assist gas to reduce disruption of the liquid jet.

BACKGROUND OF THE DISCLOSURE

Liquid-jet guided laser technology, sometimes referred to as Liquid MicroJet (LMJ), couples the laser focus into a small liquid-jet, for example, through a focusing lens. This coupling takes place in a coupling unit. The coupling unit can include a metal chamber on the side of the focusing lens that is closed with a laser protection window. The opposite side the chamber carries a nozzle. Liquid provided to the coupling unit flows between window and nozzle and leaves the nozzle in form of a liquid-jet. The energy of the laser spot in the focal plane is captured inside the liquid-jet and guided to the work piece through internal reflection. This method eliminates the necessity to control the distance of the work piece precisely because the required energy to perform the processing is available throughout the laminar length of the liquid-jet. Any liquid that provides suitable light guide capabilities can be used to form the liquid-jet.

The laminar length of the liquid-jet can be increased to extend the working distance of the process by providing an assist gas to the liquid-jet. The assist gas is guided as a direct boundary layer to the liquid-jet in order to reduce the resistance between liquid and ambient air and thereby increase the laminar length of the liquid-jet. Thus the liquid jet is surrounded by the assist gas and inside the coupling unit, the assist gas is directed toward to the liquid jet. For example, the assist gas can enter the coupling unit in the horizontal plane toward the liquid-jet that is travelling in the vertical plane. The assist gas and the liquid jet then leave the system, with the liquid jet in the middle surrounded by the assist gas.

There is dependency between the assist gas and the liquid jet. For example, the pressure and flow properties of the assist gas can be selected to optimize the laminar flow of the liquid jet. Other operating conditions of the assist gas can adversely affect the liquid jet. For example, a high pressure of the assist gas can shorten the laminar flow of the liquid jet, and an even higher pressure of the assist gas can destroy the liquid jet. The assist gas can also interrupt internal reflection of the laser beam in the liquid jet thereby affecting laser-processing power.

BRIEF DESCRIPTION OF THE DISCLOSURE

Aspects and advantages of the disclosure will be set forth in part in the following description, or may be obvious from the description, or may be learned through practice of the disclosure.

A head assembly for a liquid jet guided laser system is disclosed having a coupling unit removably disposed to a laser focus optic module of the laser system. The coupling unit has a nozzle assembly removably connected to the coupling unit. The nozzle assembly defines an axial direction and radial direction and has a liquid jet nozzle and a nozzle cap. The liquid jet nozzle is configured to form a liquid jet. The nozzle cap has a nozzle cap body defining a liquid jet hole axially aligned and extending through the center of the nozzle cap body. A plurality of axial assist gas conduits and static assist gas conduits are in fluid communication with an assist gas source and enter the nozzle cap body through entrance ports positioned in an annular pattern concentric with the liquid jet hole. The axial assist gas conduits and static assist gas conduits and extend through the nozzle cap body to individually transport assist gas to axial exit ports and static exit ports positioned to exhaust assist gas proximate the liquid jet. At least a portion of the plurality of axial assist gas conduits are partitioned from fluid communication with the liquid jet hole. The liquid jet guided laser system is also disclosed having a lateral movement assembly configured to attach to the laser focus optic module with the coupling unit removably attached to the lateral movement assembly.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 1 shows a cross section through an embodiment of the head assembly.

FIG. 2 is a side view of an embodiment of the nozzle cap.

FIG. 3 is a top view of an embodiment of the nozzle cap.

FIG. 4 is a perspective view of an embodiment of the nozzle cap.

FIG. 5 is a perspective of another embodiment of the nozzle cap having static assist gas ports.

FIG. 6 is an end view of an embodiment of the nozzle cap.

Repeat use of reference characters in the present specification and drawings is intended to represent the same or analogous features or elements of the present disclosure.

DETAILED DESCRIPTION OF THE DISCLOSURE

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "axial" and "radial" refer to the relative direction with respect to fluid flow in the central fluid pathway with "axial" being parallel to the central fluid pathway and "radial" being perpendicular to the central fluid pathway and diverging from a common center point in the central fluid pathway. Also, "upstream" refers to the direction from which the fluid flows, and "downstream" refers to the direction to which the fluid flows.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

FIG. 1 shows a cross section through an embodiment of the head assembly (21) of a liquid jet guided laser system 20 that can include a coupling assembly 22 coupled to a laser focus optic module 24. The laser focus optic module 24 can include a laser beam 26 and an optical element such as a focus lens 28. In some embodiments, adjusting the focus of the laser beam 26 is assisted by a lateral movement assembly 30 that can be coupled between the laser focus optic module 24 and the coupling assembly 22, thus allowing the coupling assembly 22 to move in a lateral plane perpendicular to the direction of the laser beam 26.

A mount 51 has an annular connecting part 53, the mount 51 forming a type of funnel to pass the focused laser beam 26 from the laser focus optic module 24 through the lateral movement assembly 30. The laser beam 26 is focused through the window element 62 into the fluid nozzle 71 in the liquid jet nozzle 65. The mount 51 surrounds the coupling unit 57 in an annular shape and holds it in a coaxial arrangement. The top the coupling unit 57 has an opening 59 which tapers conically from top to bottom. At the lower end of the conical opening 59 a shoulder is formed on which the window element 62 contacts. On the underside of the window element 62 there is a nozzle assembly 60 having a liquid jet nozzle 65 and a nozzle cap 77. A thin intermediate space 63 serves as a fluid inflow line between the window element 62 and the liquid jet nozzle 65.

The liquid 70 (for example water) is fed in with the necessary pressure (for example 400 bar) via an annular duct 69 and then via radial lines 67 into the intermediate space 63. The liquid jet nozzle 65 is inserted from below into a cylindrical interior space of coupling unit 57 adjacent the fluid nozzle 71. The liquid jet nozzle 65 has, on its upper side facing the intermediate space 63, a recess in which the fluid nozzle 71 is inserted. The fluid nozzle 71 has a central, axial duct which forms the fine jet of fluid 33 (see FIG. 2) which guides the laser radiation in the manner of an optical waveguide. The duct has a diameter corresponding to the diameter of the desired jet of fluid, for example 30 to 60 micrometers.

Adjoining the fluid nozzle 71 there is a gas retaining space which is formed in the present example from an upper partial space 73 and a lower partial space 75. This allows the assist gas 31, which is fed in at the lower end of the liquid jet nozzle 65, to expand without disrupting the jet of fluid 33.

FIGS. 2-6 are various views of a nozzle cap 77 that is mounted on the underside of the liquid jet nozzle 65. The nozzle cap 77 connects at a location where the upper partial space 73 and lower partial space 75 adjoin one another. The nozzle cap 77 has a nozzle cap body 78 defining a liquid jet hole 79 axially aligned and extending through the center of the nozzle cap body 78 from the cavity which forms the lower partial space 75 to the bottom tip. It tapers from top to bottom conically in an axial direction. The liquid jet hole 79 has a diameter of, for example, 1-2 mm.

The nozzle cap 77 has an assist gas manifold 83 (see FIG. 1) positioned adjacent the top surface of the nozzle cap 77. The manifold 83 is supplied through an annular space 85 (see FIG. 1). From the manifold 83, the assist gas 31 is introduced to a plurality of axial assist gas conduits 8a, 81b and static assist gas conduits 32. The plurality of axial gas conduits 8a, 81b and static assist gas conduits 32 can be any number of conduits suitable for delivering the assist gas 31 to the various locations. The diameters of both the axial assist gas conduits 8a, 81b and static assist gas conduits 32 can be different or the same, and can be in the range of approximately 0.005" diameter to 0.03" diameter. The plurality of axial assist gas conduits 8a, 81b are in fluid communication with an assist gas source 31 entering the nozzle cap body 78 through entrance ports 6a, 61b (FIG. 2) and positioned in an annular pattern concentric with the liquid jet hole 79. Static assist gas conduits 32 are also in fluid communication with the assist gas source 31 and can be positioned to extend in a radial pattern to exhaust static assist gas perpendicular to the central fluid pathway. The axial assist gas conduits 8a, 81b extend through the nozzle cap body 78 to individually transport assist gas 31 to axial exit ports 9i a, 91b positioned to exhaust assist gas 31 proximate the liquid jet 33. At least a portion of the axial assist gas conduits 8a, 81b are partitioned from fluid communication with the liquid jet hole 79 to decouple the assist gas 31 from the liquid jet 33. The axial exit ports 9a, 91b can be configured as axial exit ports formed to throw the assist gas at a liquid jet convergence angle θ in the range of about 10 degrees to about 40 degrees.

FIGS. 2 and 5 show an embodiment of a diaphragm 42 that can be removably disposed in a diaphragm slot 41 positioned perpendicular to the axial direction through the liquid jet hole 79 and extending sufficient distance to block assist gas communication through the diaphragm 42. The diaphragm can be approximately 0.04" to 0.5" thick with a center hole of approximately 0.02" to 0.05" diameter. These dimensions can vary within an aspect ratio (hole diameter: diaphragm thickness) of between approximately 1:2 and 1:10. FIGS. 3 and 4 are top and perspective views of the nozzle cap 77 shown in FIG. 2.

FIG. 5 is another embodiment shape of the nozzle cap 77 having a plurality of static assist gas conduits 32 with static exit ports 35 positioned to exhaust into the lower portion 75. The static exit ports 35 exit the nozzle cap body 78 in a radial pattern to exhaust static assist gas 31 approximately perpendicular to the central fluid pathway. The static exit ports diverge from a common center point in the central fluid pathway. FIG. 6 is a bottom view of the FIG. 4 embodiment.

Additive manufacturing technologies suitable for building the nozzle cap 77 with axial assist gas conduits 8a, 81b, static assist gas conduits 32, diaphragm 42 and other portions of the LMJ head assembly (21) include, but are not limited to, material jetting, binder jetting, material extrusion, powder bed fusion, direct metal laser melting, selective laser melting, selective laser sintering, direct metal laser sintering, electron beam melting, selective heat sintering, sheet lamination, directed energy deposition and/or combinations thereof.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A head assembly for a liquid jet guided laser system comprising;
   a coupling unit removably disposed to a laser focus optic module of the laser system, the coupling unit comprising;
   a nozzle assembly removably connected to the coupling unit, the nozzle assembly defining an axial direction and radial direction and comprising a liquid jet nozzle and a nozzle cap, wherein the liquid jet nozzle is configured to form a liquid jet, the nozzle cap comprising;
      a nozzle cap body defining a liquid jet hole axially aligned and extending through the center of the nozzle cap body,
      a plurality of axial assist gas conduits and static assist gas conduits in fluid communication with an assist gas source, the plurality of axial assist gas conduits and plurality of static assist gas conduits entering the nozzle cap body through entrance ports positioned in an annular pattern concentric with the liquid jet hole and extending through the nozzle cap body to individually transport assist gas to axial exit ports and static exit ports positioned to exhaust assist gas proximate the liquid jet; and
      wherein at least a portion of the plurality of axial assist gas conduits are partitioned from fluid communication with the liquid jet hole.

2. The head assembly of claim 1, wherein at least a portion of the axial exit ports are positioned to throw the assist gas at a liquid jet convergence angle θ in the range of about 10 degrees to about 40 degrees.

3. The head assembly of claim 1, wherein at least a portion of the static exit ports are positioned for radial fluid communication with the liquid jet hole.

4. The head assembly of claim 1, wherein the diameter of the plurality of axial assist gas conduits and the plurality of static assist gas conduits are in the range of approximately 0.005 inches to approximately 0.03 inches.

5. The head assembly of claim 1, further comprising a diaphragm removably disposed in a diaphragm slot.

6. The head assembly of claim 5, wherein the diaphragm is positioned perpendicular to the axial direction of the liquid jet and extends sufficient distance to block assist gas communication through the diaphragm.

7. The head assembly of claim 5 further comprising a diaphragm center hole defining an aspect ratio in the range of approximately 1:2 to 1:10.

8. The head assembly of claim 1, wherein the coupling unit comprises a liquid for supplying an annular duct.

9. The head assembly of claim 1, further comprising an assist gas manifold configured to supply assist gas to the plurality of axial assist gas conduits and plurality of static assist gas conduits through an annular space.

10. The head assembly of claim 1, wherein the coupling unit comprises a window element removably disposed to the nozzle assembly.

11. A liquid jet guided laser system comprising;
    a lateral movement assembly configured to attach to a laser focus optic module;
    a coupling assembly removably attached to the lateral movement assembly wherein the lateral movement assembly allows adjusting positions of the coupling assembly in a plane perpendicular to a laser beam of the liquid jet guided laser system, the coupling assembly comprising;
    a nozzle assembly removably connected to a coupling unit, the nozzle assembly defining an axial direction and radial direction and comprising a liquid jet nozzle and a nozzle cap, wherein the liquid jet nozzle is configured to form a liquid jet, the nozzle cap comprising;
       a nozzle cap body defining a liquid jet hole axially aligned and extending through the center of the nozzle cap body, a plurality of axial assist gas conduits and static assist gas conduits in fluid communication with an assist gas source, the plurality of axial assist gas conduits and plurality of static assist gas conduits entering the nozzle cap body through entrance ports positioned in an annular pattern concentric with the liquid jet hole and extending through the nozzle cap body to individually transport assist gas to axial exit ports and static exit ports positioned to exhaust assist gas proximate the liquid jet; and
       wherein at least a portion of the plurality of axial assist gas conduits are partitioned from fluid communication with the liquid jet hole.

12. The laser system of claim 11, wherein at least a portion of the axial exit ports are positioned to throw the assist gas at a liquid jet convergence angle θ in the range of about 10 degrees to about 40 degrees.

13. The laser system of claim 11, wherein at least a portion of the static exit ports are positioned for radial fluid communication with the liquid jet hole.

14. The laser system of claim 11, wherein the diameter of the plurality of axial assist gas conduits and plurality of static assist gas conduits is in the range of approximately 0.005 inches to approximately 0.03 inches.

15. The laser system of claim 11, further comprising a diaphragm removably disposed in a diaphragm slot.

16. The laser system of claim 15, wherein the diaphragm is positioned perpendicular to the axial direction of the liquid jet and extends sufficient distance to block assist gas communication through the diaphragm.

17. The laser system of claim 15 further comprising a diaphragm center hole defining an aspect ratio in the range of approximately 1:2 to 1:10.

18. The laser system of claim 11, wherein the coupling unit comprises a liquid for supplying an annular duct.

19. The laser system of claim 11, further comprising an assist gas manifold configured to supply assist gas to the plurality of axial assist gas conduits and plurality of static assist gas conduits through an annular space.

20. The laser system of claim 11, wherein the coupling unit comprises a window element removably disposed to the nozzle assembly.

* * * * *